(12) United States Patent
Molisch et al.

(10) Patent No.: US 9,705,579 B2
(45) Date of Patent: Jul. 11, 2017

(54) TRANSCEIVERS AND METHODS FOR USE IN TRANSMITTING INFORMATION IN A MASSIVE MIMO SYSTEM

(71) Applicants: Andreas F. Molisch, Los Angeles, CA (US); Haralabos Papadopoulos, San Jose, CA (US)

(72) Inventors: Andreas F. Molisch, Los Angeles, CA (US); Haralabos Papadopoulos, San Jose, CA (US)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 14/731,196

(22) Filed: Jun. 4, 2015

(65) Prior Publication Data

US 2015/0358055 A1 Dec. 10, 2015

Related U.S. Application Data

(60) Provisional application No. 62/008,969, filed on Jun. 6, 2014.

(51) Int. Cl.
*H04B 7/02* (2017.01)
*H04B 7/06* (2006.01)
*H04B 7/0413* (2017.01)

(52) U.S. Cl.
CPC ......... *H04B 7/0608* (2013.01); *H04B 7/0413* (2013.01)

(58) Field of Classification Search
CPC .. H04B 7/0684; H04B 7/0639; H04B 1/0475; H04B 1/16; H04B 7/0413; H04B 7/0854; H04B 7/0417
See application file for complete search history.

(56) References Cited

U.S. PATENT DOCUMENTS 7,327,983 B2 2/2008 Mehta et al.
7,382,840 B2 6/2008 Molisch et al.
(Continued)

FOREIGN PATENT DOCUMENTS

KR 2007-0064235 A * 6/2007

OTHER PUBLICATIONS

El Ayach, O., et al., "Spatially Sparse Precoding in Millimeter Wave MIMO Systems", IEEE Transactions on Wireless Communications, vol. 13, Issue 3, Mar. 2014, pp. 1499-1513.
(Continued)

*Primary Examiner* — Mohamed Kamara
(74) *Attorney, Agent, or Firm* — Blakely, Sokoloff, Taylor & Zafman LLP (57) ABSTRACT

A method and apparatus is disclosed herein for transmitting information in massive MIMO system. In one embodiment, the apparatus comprises a plurality of antenna elements; a baseband processor; a plurality of radio-frequency (RF) chains coupled to the baseband processor; a plurality of switches coupled to the plurality of RF chains, wherein positions of switches in the plurality of switches being determined by instantaneous channel state information; a radio-frequency (RF) preprocessor coupled between the plurality of switches and the plurality of antenna elements, the RF preprocessor to apply a preprocessing matrix to signals, elements of the preprocessing matrix being adjusted as a function of average channel state information, and wherein the positions of the switches and elements of the preprocessing matrix are jointly chosen, and wherein the preprocessing matrix is chosen based on a metric related to expected performance obtained from at least one channel realization.

35 Claims, 7 Drawing Sheets

(56) References Cited

U.S. PATENT DOCUMENTS

| | | | |
|---|---|---|---|
| 7,443,925 B2 | 10/2008 | Mehta et al. | |
| 7,751,495 B1* | 7/2010 | Palanivelu | H04B 7/0678 375/265 |
| 7,917,107 B2 | 3/2011 | Gu et al. | |
| 8,036,257 B2* | 10/2011 | Mailaender | H04B 7/063 375/148 |
| 8,046,029 B2 | 10/2011 | Teo et al. | |
| 8,179,990 B2 | 5/2012 | Orlik et al. | |
| 8,284,686 B2 | 10/2012 | Gu et al. | |
| 8,514,815 B2 | 8/2013 | Gu et al. | |
| 9,246,560 B2* | 1/2016 | Sampath | H04B 7/0417 |
| 2003/0043929 A1* | 3/2003 | Sampath | H04B 7/0417 375/267 |
| 2005/0287962 A1* | 12/2005 | Mehta | H01Q 3/26 455/101 |
| 2010/0048232 A1* | 2/2010 | Hwang | H04L 25/03343 455/501 |
| 2010/0054191 A1* | 3/2010 | Higuchi | H04B 1/715 370/329 |
| 2012/0281654 A1* | 11/2012 | Aiba | H04L 5/0007 370/329 |

OTHER PUBLICATIONS

Dongwoon Bai, et al., "Beam Selection Gain Versus Antenna Selection Gain", IEEE Transactions on Information Theory, vol. 57, Issue 10, Oct. 2011, pp. 6603-6618.

Zhemin Xu, et al., "Analysis of MIMO Systems with Receive Antenna Selection in Spatially Correlated Rayleigh Fading Channels", IEEE Transactions on Vehicular Technology, vol. 58, Issue 1, Jan. 2009, pp. 251-262.

Clark, Charles E., "The Greatest of a Finite Set of Random Variables", Operations Research, vol. 9, No. 2, Mar.-Apr. 1961, pp. 145-162.

Dai, L., et al., "Optimal Antenna Selection Based on Capacity Maximization for MIMO Systems in Correlated Channels", IEEE Transactions on Communications, vol. 54, Issue 3, Mar. 2006, pp. 563-573.

Hugl, K., et al., "Downlink Beamforming for Frequency Division Duplex Systems", GLOBECOM '99, Rio de Janeiro, Brazil, Dec. 5-9, 1999, vol. 4, pp. 2097-2101.

Martin, C., et al., "Asymptotic Eigenvalue Distributions and Capacity for MIMO Channels Under Correlated Fading", IEEE Transactions on Wireless Communications, vol. 3, Issue 4, Jul. 2004, pp. 1350-1359.

Marzetta, T.L., "Nonocooperative Cellular Wireless with Unlimited Numbers of Base Station Antennas", IEEE Transactions on Wireless Communications, vol. 9, Issue 11, Nov. 2010, pp. 3590-3600.

Molisch, Andreas F., et al., "MIMO Systems with Antenna Selection", IEEE Microwave Magazine, vol. 5, Issue 1., Aug. 2004, pp. 46-56.

Molisch, Andreas F., et al., "DFT-based hybrid antenna selection schemes for spatially correlated MIMO channels", 14th IEEE Proceedings on Personal, Indoor, and Mobile Radio Communications, Sep. 7-10, 2003, vol. 2, pp. 1119-1123.

Ross, A.M., "Computing Bounds on the Expected Maximum of Correlated Normal Variables", Methodology and Computing in Applied Probability, vol. 12, No. 1, 2010, 28 pages.

Sudarshan, P., et al., "Channel Statistics-Based RF Pre-Processing with Antenna Selection", IEEE Transactions on Wireless Communications, vol. 5, Issue, 12, Dec. 2006, pp. 3501-3511.

Wenwu Xie, et al., "Closed-Form Capacity Expression for Transmit Antenna Selection Systems with Correlated Fading Channels", IEEE 64th Vehicular Technology Conference, Montreal, Quebec, Sep. 25-28, 2006, pp. 1-5.

Hua Yu, et al., "Capacity Bounds for Joint Transmit and Receive Antenna Selection Systems with Correlated Fading Channels", 4th International Conference on Wireless Communications, Networking and Mobile Computing, Dalian, China, Oct. 12-14, 2008, pp. 1-4.

Xinying Zhang, et al., "Variable-phase-shift-based RF-baseband codesign for MIMO antenna selection", IEEE Transactions on Signal Processing, vol. 53, Issue 11, Nov. 2005, pp. 4091-4103.

Marzetta, T.L., "How Much Training Is Required for Multiuser MIMO?", Fortieth Asilomar Conference on Signals, Systems and Computers, Pacific Grove, California, Oct. 29-Nov. 1, 2006, pp. 359-363.

Smith, P., et al., "An Approximate Capacity Distribution for MIMO Systems", IEEE Transactions on Communications, vol. 52, Issue 6, Jun. 2004, pp. 887-890.

* cited by examiner

TRANSCEIVERS AND METHODS FOR USE IN TRANSMITTING INFORMATION IN A MASSIVE MIMO SYSTEM

PRIORITY

The present patent application claims priority to and incorporates by reference the corresponding provisional patent application Ser. No. 62/008,969, titled, "Transceivers and Methods for Use in Transmitting Information in a Massive MIMO System," filed on Jun. 6, 2014.

FIELD OF THE INVENTION

Embodiments of the present invention relate to the field of multiple input, multiple output (MIMO) wireless communication systems; more particularly, the embodiments of the present invention relate to selecting antennas in MIMO wireless communication systems.

BACKGROUND OF THE INVENTION

Massive multiple input, multiple output (MIMO) has recently become a topic of great interest in the industry. In massive MIMO, the number of base station antennas can reach dozens or even hundreds. The main promises of massive MIMO are (i) simplified signal processing in the multi-user case, since simple conjugate beamforming provides quasi-optimum performance, and (ii) drastically reduced energy consumption, due to the high beamforming gain, and thus the possibility of lowering the transmit power while still retaining a high signal-to-noise ratio (SNR). However, these advantages are counteracted, in practice, by the increased hardware complexity associated with having many antennas and many associated up/down conversion chains, and by the increased energy consumption due to all that hardware.

A popular method for reducing MIMO complexity while retaining most of its benefits is antenna selection, where a subset of size L taken from the set of the N available antenna signals is selected and connected, via a switch, to L (L<N) radio-frequency (RF) chains. For the transmit case, each RF chain includes a modulator, digital-to-analog converter (DAC), and a power amplifier and each transmit antenna requires an RF chain; similar statements can be made for the receive case. This method has shown to provide the same diversity order as a full-complexity MIMO system. However, this method does not provide the same amount of beamforming gain, and thus shows reduced performance in particular in channels with small angular spread, as typically occur in cellular systems. To remedy this situation, a preprocessing of the received signal by an RF preprocessing matrix can be performed, which essentially transforms the received signals from the antenna space into a beamspace. The switch then subsequently performs "beam selection" instead of antenna selection. The first proposal of this method used a fixed matrix, namely a (spatial) FFT matrix, for the preprocessing. Another proposal also considers a simplified structure in which each RF chain is connected, via adaptive phase shifters to a fixed subset of antenna elements. In the present description, the optimum precoding in baseband and optimum values of the phase shifters are discussed.

For the general preprocessor structure, others have shown that if the preprocessing can be adapted based on instantaneous channel state information, then close-to-optimum performance can be maintained even with a small number of RF chains. However, such a fast adaptation is not necessarily easy or desirable, both due to the necessary speed of the hardware reconfiguration, and (for the transmit case) due to the required speed and overheads of the required feedback. Others have investigated the case where the preprocessing matrix is adapted only based on the average CSI, which changes on a much slower time scale, and which is usually known at transmitter and receiver (note that for FDD systems, the instantaneous CSI at uplink and downlink is usually uncorrelated, while the average CSI is essentially identical. However, the determination of the entries of the preprocessing matrix can suffer from two major drawbacks: (i) it is based on an approximation, so use of the computed parameters may result in significant performance loss, and (ii) it is not easily generalized to the multi-user case.

Performance of antenna selection in correlated channels has been analyzed in terms of the symbol error probability. There has been disclosure regarding the selection of a single antenna, and a system has been disclosed where the selection is based on the average, not the instantaneous, channel characteristics. There has also been disclosure of antenna selection in channels where the correlation comes from a Rician component, not from small angular spread of Rayleigh-fading components.

SUMMARY OF THE INVENTION

A method and apparatus is disclosed herein for transmitting information in massive MIMO system. In one embodiment, the apparatus comprises a plurality of antenna elements; a baseband processor; a plurality of radio-frequency (RF) chains coupled to the baseband processor; a plurality of switches coupled to the plurality of RF chains, wherein positions of switches in the plurality of switches being determined by instantaneous channel state information; a radio-frequency (RF) preprocessor coupled between the plurality of switches and the plurality of antenna elements, the RF preprocessor to apply a preprocessing matrix to signals, elements of the preprocessing matrix being adjusted as a function of average channel state information, and wherein the positions of the switches and elements of the preprocessing matrix are jointly chosen, and wherein the preprocessing matrix is chosen based on a metric related to expected performance obtained from at least one channel realization.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the invention include techniques for improving the performance of MIMO wireless communication systems, including particularly massive MIMO communication systems. The wireless communication system includes base stations (or access points) and user terminals. In one embodiment, both the base stations and the user terminals, as part of their transmitter and receiver, include RF chains that may be coupled to a radio-frequency (RF) preprocessing matrix of a RF preprocessor using switches. The techniques described herein include determining and adapting the entries of an RF preprocessing matrix in a MIMO system (e.g., massive MIMO system), as well as determining switch positions (e.g., potentially optimum switch positions) that are used for selecting signals from RF chains to be input into the preprocessing matrix as part of transmission or for selecting signals to be input from a preprocessing matrix to RF chains as part of reception.

Embodiments of the invention allow lowering the complexity of MIMO (especially massive MIMO) by reducing the necessary hardware, as well as energy consumption during operation. This helps solve the problem of the large hardware effort for massive MIMO systems, which in turn is related to the large number of RF chains needed for both transmit and receive.

In one embodiment, the techniques include determining, for a given preprocessing matrix, the achievable capacity (optimizing over the set of switch positions) in an efficient manner, and then using this knowledge as the "inner core" of a computational numerical optimization procedure (a computation method). A variety of ad-hoc initializations for the optimization procedure are disclosed as well. The optimization procedure provides better performance than methods currently known to the inventors that are based on either ad-hoc determination of the pre-processing matrix or approximations.

In addition, signaling embodiments are disclosed that enable determination and adaptation of the preprocessing matrix and the associated switch positions via an efficient use of transmission resources. Furthermore, in one embodiment, the signaling embodiments provide resource-efficient sounding options for enabling the computation method.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

The following description provides a general solution strategy for the single-user case for transmission in the downlink direction. However, the disclosed techniques can also be applied with appropriate modifications to enable for single-user transmission in the uplink direction due to the duality of the channel characteristics. Note, however, that the same knowledge of channel state information must be available for this equivalence to hold. Note also the techniques described herein are also applicable to multi-user transmission and reception as well.

Figure 1:
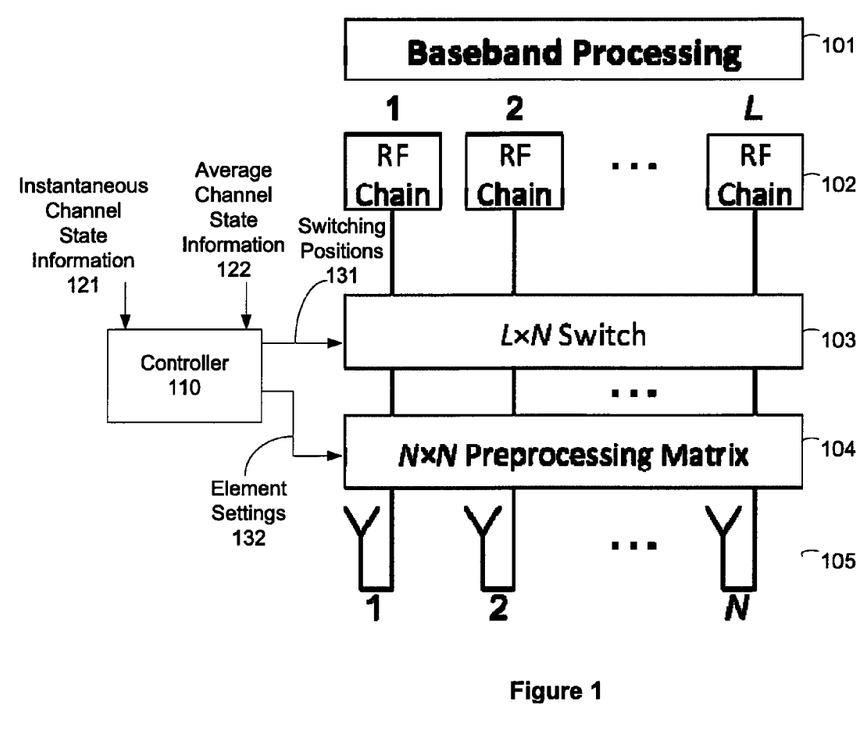
FIG. 1 illustrates a block diagram of one embodiment of reduced complexity baseband processing at a base station.

FIG. 1 is a block diagram of one embodiment of a wireless device. In one embodiment, the wireless device comprises a base station. In another embodiment, the wireless device comprises a user equipment (UE), or mobile station. Referring to FIG. 1, baseband processing block 101 generates up to L data streams for transmission. RF chains $102_{1-L}$ receive the data streams from baseband processing block 101 and modulate the data streams to RF signals. In one embodiment, each of RF chains $102_{1-L}$ includes a modulator, a digital-to-analog converter (DAC) and a power amplifier. Switch 103 is a L×N switch that routes RF signals output by RF chains $102_{1-L}$ to antenna feeds for antennas $105_{1-N}$. Preprocessor 104 applies a preprocessing matrix, or transformation matrix, to the feed outputs by switch 103. The signal outputs from preprocessor 104 are transmitted by antennas $105_{1-N}$.

The wireless device of FIG. 1 includes a controller 110 that selects switch positions 131 and settings of the elements of the preprocessing matrix based on instantaneous channel state information 121 and average channel state information 122. In one embodiment, the wireless device uses a preprocessor-adaptation procedure to adapt the preprocessing matrix. In one embodiment, the adaptation procedure includes a set of coupled inner/outer optimization operations. First, in the first operation, the procedure determines the positions of the selection switches of switch 103 that increase, and potentially maximize, the capacity of the wireless device, for any fixed transformation (preprocessing) matrix and for a given correlation matrix of the channel between the transmitter and the receiver. This is referred to herein as the "inner" optimization operation. Once the inner optimization operation has been performed, the wireless device performs the outer optimization operation, during which the procedure chooses the transformation (preprocessing) matrix that increases, and potentially maximizes, the capacity value provided by the "inner" optimization operation, possibly within given constraints. For example, one constraint is that the elements of the preprocessor matrix can induce different phase shifts, but no changes in amplitude, e.g., when no variable-gain amplifiers are to be used within the preprocessor matrix.

Thus to compute the optimization procedure, for a given preprocessing matrix, the expected value of the "instantaneously maximized capacity is computed", and then, in an outer loop optimization, preprocessing matrix 104 is chosen. This computation of preprocessing matrix 104 does not compute the actual switch positions for each CSI instant, but rather uses mathematical approximations to find the expected value of the capacity. Note that this is in contrast to actual operation where preprocessing matrix 104 is as input, and for each instantaneous channel realization, the optimum switch position is used.

Embodiments for performing these two operations are described below.

Embodiments for Determining Selection Switch & Expected Capacity for Given Preprocessing (Transformation) Matrix In one embodiment, the method for performing the inner optimization operation provides a solution to the sub-problem of finding the optimum position of the selection switch, and the value of the associated capacity, for a given preprocessing (transformation) matrix and given a channel correlation matrix for the channel between the transmitter and the receiver. That is, different switch positions are obtained for different realizations of the propagation channel.

In one embodiment, to determine the positions for the selection switch and the value of the associated capacity, the wireless device performs the following three operations. First, in one embodiment, for a particular switch setting (i.e., which inputs of the preprocessing matrix are connected to the RF chains), the capacity distribution (taken over the ensemble of the small-scale fading realizations of the channel) can be approximated as a Gaussian function. In the one embodiment, the eigenvalues are assumed to be jointly Gaussian random variables. In another embodiment, the eigenvalues are assumed to be jointly log-normally distributed. Second, the cross-correlation between the Gaussians corresponding to all switch positions is then computed. Then, the maximum from a set of correlated Gaussian variables is identified and the switch position associated with the maximum is selected for use. In one embodiment, finding the maximum of the set of correlated Gaussian variables is obtained using, for example, a well-known algorithm called MaxGauss, though numerous other methods can be used as well.

Figure 3:
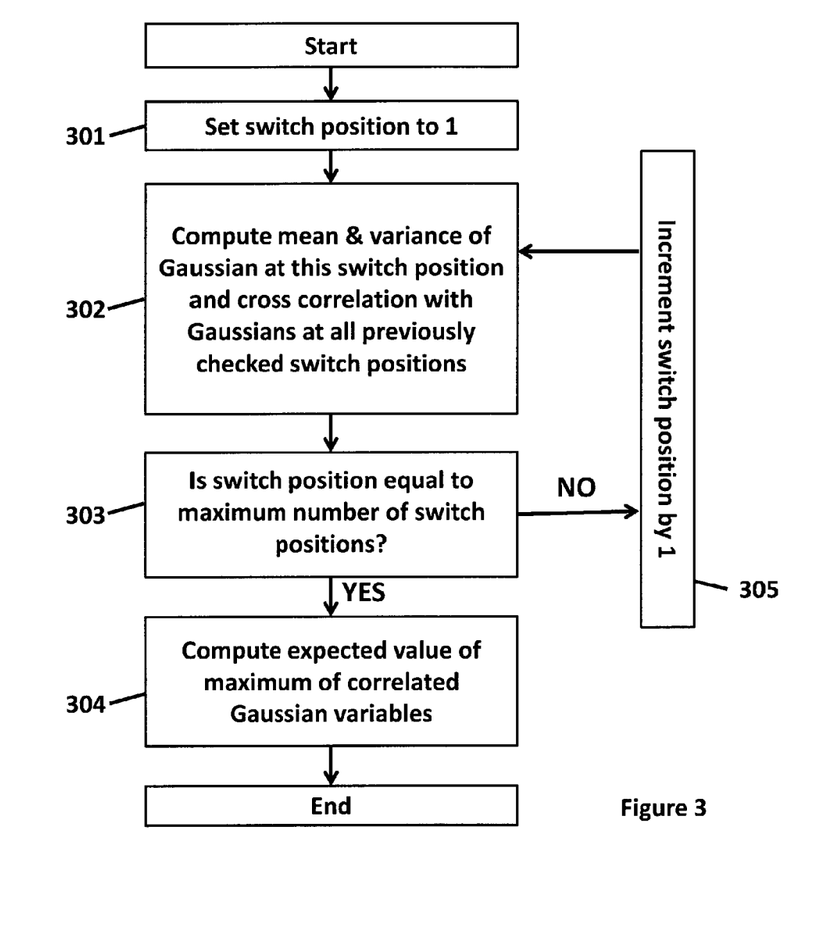
FIG. 3 illustrates a flow diagram depicting one embodiment of a method for solving an inner sub-problem.

A sample flow diagram of the disclosed method for solving the inner subproblem is shown in FIG. 3. The process is performed by processing logic that may comprise hardware (circuitry, dedicated logic, etc.), software (such as is run on a general purpose computer system or a dedicated machine), firmware, or a combination of the three. Referring to FIG. 3, processing logic initially sets the switch position to one (processing block 301). Note that the selection of the switch is only done "virtually" (i.e., there is no actual setting the switch in the transceiver; only a certain switch position is assumed for the purpose of computing the resulting capacity distribution).

After setting the switch position, processing logic computes the mean and variance of the Gaussian at the switch position and computes a cross correlation with the Gaussians at all previously checked switch positions (processing block 302).

Afterward, processing logic tests whether the switch position is equal to the maximum number of switch positions (processing block 303). If not, processing logic transitions to processing block 305 where the switch position is incremented by one and thereafter the process transitions back to processing block 302 to repeat the process until the computations of the approximate capacity and the mean and variance of the Gaussians has been calculated for all switch positions.

If the switch position equals the maximum number of switch positions, processing transitions to processing block 304 where processing logic computes the expected value of the maximum of the correlated Gaussian variables, and the process ends.

Thus, as set forth above, the operations of processing block 301-302 are done together, i.e., for each switch position, the mean, variance, and cross-correlations are found. In an alternative embodiment, a further "looping" occurs in which, (assuming outer loop remains the same as described above) in a "middle loop," the process steps through different instantaneous channel realizations (but the same average CSI and the same pre-processing matrix are used), a determination is made as to the capacity (which is a realization of a random variable) for each switch position, and the maximum is taken. Then, after obtaining a sufficient number of such realizations, the expectation of the maximima is taken and used.

Methods for Determining Transformation (Pre-Processing) Matrix that Maximizes Capacity After identifying the maximum from a set of correlated Gaussians, the pre-processing (transformation) matrix is determined that increases, and potentially, maximizes the capacity. This is the outer optimization operation. Embodiments of these methods target maximizing the capacity over all possible values of the preprocessing matrix, within given algorithmic complexity and other practical constraints. In other words, the optimum preprocessing matrix could be determined by numerically very demanding methods, and finding the true optimum might require a huge amount of time. The techniques described herein are approximate, but need less computational effort.

The result of the inner optimization operation described above is not a closed-form expression. In general, it is not possible to determine whether or not the outer optimization is a convex problem. In one embodiment, only "brute-force" optimization methods are used. Still, it is beneficial that the inner optimization operation be done as efficiently as possible, since it constitutes the "inner loop" of the overall problem solution, and thus is called on many times.

Figure 2:
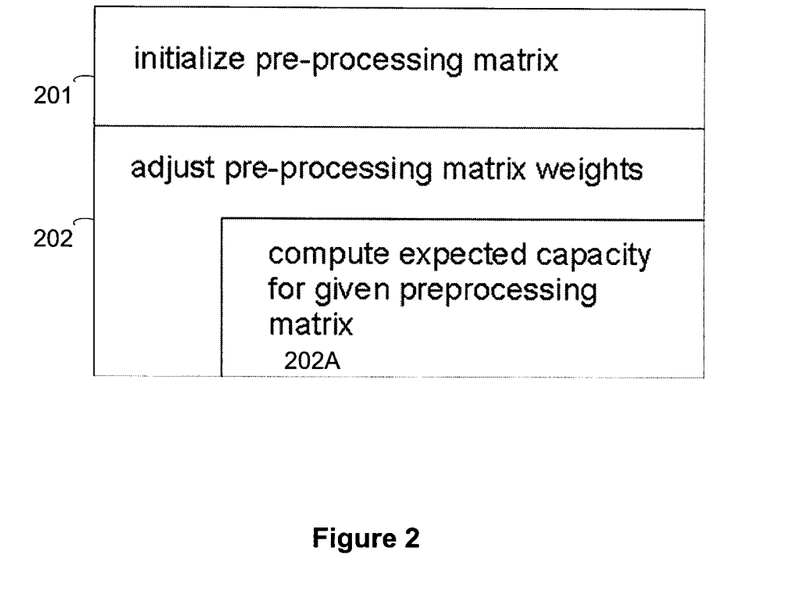
FIG. 2 illustrates a high-level flow diagram of one embodiment of a method for solving an outer sub-problem.

A high-level description of the outer-loop iterations (together with the initialization stage) is shown in FIG. 2. Referring to FIG. 2, the process for selecting a preprocessing matrix comprises initializing the pre-processing matrix (processing block 201). In one embodiment, this initialization is performed by determining an angular power spectrum. Specifically, in one embodiment, the device determines the power angular spectrum of the propagation channel and chooses the elements of the pre-processing matrix in such a way to form beams in the directions in which the power angular spectrum takes on a significant value. Then processing logic adjusts the pre-processing matrix (processing block 202). In one embodiment, adjusting the pre-processing matrix comprises adjusting weights of the pre-processing matrix. As part of the process of adjusting the pre-processing matrix, processing logic computes the expected capacity for a given, or particular, pre-processing matrix (processing block 202A). The adjustment of weights may be performed by simply selecting a different pre-processing matrix that resulted in a higher expected capacity than the particular pre-processing matrix that had its expected capacity computed. One of the numerical optimization methods is a gradient descent method. The derivative of the expected capacity is taken numerically with respect to the values of the elements of the preprocessing matrix. In one embodiment, the values of the elements are adjusted (with a certain step size) in the direction of the gradient, i.e., in such a way that the capacity increase by changing elements is maximized. The initialization of this method is important, as will also be described in more detail below.

Important technical details of the techniques, in the context of the downlink of a cellular system with multi-antenna users and base stations (BSs), are described below.

Additional Technical Details of the Disclosed Methods

Consider a MIMO cellular system in the downlink. The receiver (mobile station) has M transmit antenna elements. The transmitter of a wireless device (e.g., base station) is as shown in FIG. 1 and has N receive antenna elements $105_{1-N}$ and L RF chains $102_{1-L}$. At the transmitter, the antenna elements are preceded by an N×N pre-processing matrix 104 with entries representing weights that are either arbitrary complex numbers or can be subject to certain constraints. For example, if the weights are written in the form $c_{pq} \exp(j\phi_{pq})$, $c_{pq}$ might be constrained to belong to $\{0,1\}$; and/or the $\phi_{pq}$ can be either arbitrary phases, or can be constrained to belong to a discrete set. These examples are mentioned because of their correspondence to certain hardware implementations but the present invention is not limited to these specific examples. Preprocessing matrix 104 is preceded by an N×L switch 103, whose outputs are connected to the L available RF chains $102_{1-L}$.

In one embodiment, the entries of the preprocessing matrix are updated based on the average channel state information (CSI), whereas the switch position can be determined based on instantaneous CSI. Therefore, this requires instantaneous CSI to be available at the transmitter, which must be provided through a suitable reciprocity-based (for TDD) or feedback-based (for FDD) scheme from the receiver. For the uplink case, the instantaneous CSI at the base station (BS) can be obtained more easily. In one embodiment, it is assumed that the propagation channel between transmitter and receiver is flat-fading, and follows a Kronecker model such that $H=R_r^{1/2}GR_t^{1/2}$, where G is a matrix with independent identically distributed (iid) complex Gaussian entries, and $R_t$ and $R_r$ are the correlation matrices at the transmitter and receiver.

The capacity of the system with a given preprocessing matrix and corresponding beam selection can be written as $$C = \log_2 \left| I + \frac{\rho}{K} R_r^{1/2} G R_t^{1/2} T S P S^H T^H R_t^{H/2} G^H R_r^{H/2} \right| \quad (1)$$

where ρ denotes the signal to noise ratio (SNR), the superscript $H$ denotes the Hermitian (transposition and conjugation) operation, T is the preprocessing matrix, S is a matrix representing the selection switch and P is the power allocation matrix. For ease of notation we represent $Q=TSPS^H T^H$. In one embodiment, the power allocation matrix is an identity matrix if no form of water filling is used. In another embodiment, waterfilling is used, and in yet another embodiment, mercury-waterfilling [cite paper of Verdu et al.] is used. Furthermore, it is assumed that the distribution of this capacity in Eqn. (1), over the channel realizations, can be well approximated by a non-zero mean real Gaussian distribution. For example, see Smith, et al., "An Approximate Capacity Distribution for MIMO Systems," IEEE TRANSACTIONS ON COMMUNICATIONS, VOL. 52, NO. 6, JUNE 2004 887. The realizations of this Gaussian are correlated for different switch positions, i.e., for different combinations of antenna elements. If there are common antenna elements in the different considered sets, then the source of the correlation is obvious. If the sets of considered antenna elements are disjoint, then correlation is similar to "conventional" spatial correlation of antenna signals. This is particularly true in the case of massive MIMO, where the number of antennas at the BS becomes large.

The distribution of the eigenvalues of the matrix $\hat{R}=HQH^H$ around its mean is derived in a manner well-known in the art. For example, see Martin, et al., "Asymptotic eigenvalue distributions and capacity for MIMO channels under correlated fading", *IEEE Transactions on Wireless Communications*, vol. 3, no. 4, pp. 1350-1359, July 2004. They show that the deviation of each eigenvalue is independent of the deviations of the other eigenvalues. Specifically, with λ and $\bar{\lambda}$ denoting the (random) vector of eigenvalues and its mean value respectively, the limiting distribution of $\sqrt{N}(\lambda-\bar{\lambda})$ is a zero-mean normal distribution with a correlation matrix whose ij-th entry is $$(R_\lambda)_{ij} = \delta_{ij}(\lambda_i^r)^2 \|QR_t\|^2 N \quad (2)$$

where $(\lambda_i^r)$ is the i-the ordered eigenvalue of $R_r$. Note that this characterizes the autocorrelation of the modes, i.e., the i-th and the j-th mode for the same correlation matrix of the receiver.

The disclosed methods vary this concept, by introducing the cross-correlation of the modes, namely between the i-th mode of the p-th antenna set, and the j-th mode of q-th antenna set. In particular, it can be shown that this is given as $$E\{(\lambda_i^p - \bar{\lambda}_i^p)(\lambda_j^q - \bar{\lambda}_j^q)\} = E\{(v_i^{p,r})^H \hat{R} v_i^{p,r} (v_j^{q,r})^H \hat{R}^q v_j^{q,r} + \bar{\lambda}_i^p \bar{\lambda}_j^q - \bar{\lambda}_j^q (v_i^{p,r})^H \hat{R}^p v_i^{p,r} - \bar{\lambda}_i^p (v_j^{q,r})^H \hat{R}^q v_j^{q,r}\} \quad (3)$$

where the $v_i^{p,r}$ are the eigenvectors of $R_r$, and $\overline{\lambda}_i^p$ are the eigenvalues of $E\hat{R}$.

These expressions can be further simplified and the mean and cross-correlation of the modes can be expressed as:

$$E\{(\lambda_i^p - \overline{\lambda}_i^p)\} = Tr\{Q_p R_t\} \lambda_i^r$$

$$E\{(\lambda_i^p - \overline{\lambda}_i^p)(\lambda_q^j - \overline{\lambda}_j^q)\} = \delta_{ij} \lambda_i^r \lambda_j^r \|(Q_q)^{1/2} R_t (Q_p)^{1/2}\|^2$$

where, $S_p$ and $S_q$ represent selection matrices corresponding to the p-th and q-th antenna set and $(\lambda_i^r)$ is the i-the ordered eigenvalue of $R_r$. For the p-th antenna set, the capacity can be expressed as:

$$C_p = \sum_{i=1}^{M} \log_2\left(1 + \frac{\rho \lambda_i^p}{K}\right)$$

In the limit of N,K→∞ and for finite M, the variance of $\lambda_i^p/K$ diminishes. Therefore, by the application of Cramer's theorem, it can be shown that the capacity $C_p$ converges to a Gaussian distribution. This comes in a straight-forward way by the application of the first order Taylor expansion in the equation given immediately above.

From the correlation matrix of the eigenvalues, the correlations of the capacities can be derived in a straightforward way by application of Cramer's theorem. In one embodiment, the mean and correlations of the capacities (across different modes) can be derived from the correlations of the eigenvalues using the $1^{st}$ order Taylor expansion. From Cramer's theorem, in the limit N,K→∞, these results are exact. In another embodiment, the mean can be found using the $2^{nd}$ order Taylor expansion and correlations can be found from the $1^{st}$ order Taylor expansion as:

$$E\{C_p\} = \sum_{i=1}^{M} \left[ \log_2\left(1 + \frac{\rho \overline{\lambda}_i^p}{K}\right) - \frac{(\rho/K)^2 E\{(\lambda_i^p - \overline{\lambda}_i^p)^2\}}{2\left(1 + \frac{\rho E\{\lambda_i^p\}}{K}\right)^2} \right]$$

$$E\{[C_p - \overline{C}_p][C_q - \overline{C}_q]\} = \sum_{i=1}^{M} \frac{(\rho/K)^2 E\{(\lambda_i^p - \overline{\lambda}_i^p)(\lambda_i^q - \overline{\lambda}_i^q)\}}{\left(1 + \frac{\rho E\{\lambda_i^p\}}{K}\right)\left(1 + \frac{\rho E\{\lambda_i^q\}}{K}\right)}$$

For more information, see Martin, et al., "Asymptotic eigenvalue distributions and capacity for MIMO channels under correlated fading", *IEEE Transactions on Wireless Communications*, vol. 3, no. 4, pp. 1350-1359, July 2004.

With the above approach, the capacities of the various switch selection positions can be represented by a set of correlated Gaussian variables with a known covariance matrix. The maximum of such a set can be evaluated by means of the well-known "maxgauss" algorithm, such as described in Ross, A. M. "Computing bounds on the expected maximum of correlated normal variables," *Methodology and Computing in Applied Probability*, vol. 12, no. 1, pp. 111-138, 2010. These algorithms are well-known in the art, and only used/applied here for solving the last operation of the problem, thereby concluding the "inner loop", i.e., computation of the performance (and associated switch position) for a given channel correlation matrix.

For the outer-loop iteration, the mean capacity C(T) for a given preprocessing matrix T can be computed using the inner optimization loop as mentioned above. The outer loop iteration then aims to find an optimal choice of T. In one embodiment, the optimal choice of T is computed using a gradient ascent. In one embodiment, the gradient of C(T) with respect to each component of the matrix T is computed numerically as:

$$\frac{\partial C(T)}{\partial T_{ij}} = \frac{C(T + \delta \hat{I}_{ij}) - C(T)}{\delta}$$

$$[\hat{I}_{ij}]_{ab} = \begin{cases} 1 & \text{if } a = i, b = j \\ 0 & \text{otherwise} \end{cases}$$

The result is then used to find a feasible direction of ascent. In one embodiment, the optimal update step size is prefixed. In another embodiment, it is computed using a line search algorithm. In one embodiment, the search space of T is unrestricted. In another embodiment, the elements of T are restricted to have unit amplitude and arbitrary phase shifts. Other embodiments are possible depending restrictions on type of RF hardware used. In one embodiment, the algorithm ensures convergence to a locally optimal preprocessor T. To ensure good performance, the a good initial choice of T is used as discussed in the Algorithm initialization (later below).

Figure 6:
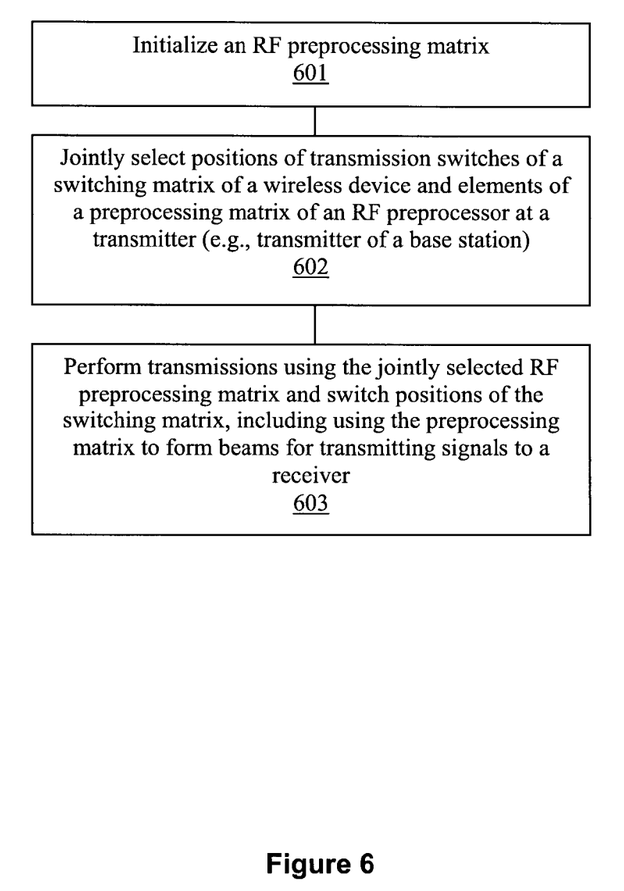
FIG. 6 is a flow diagram of one embodiment of a process for performing a wireless transmission of data.

FIG. 6 is a flow diagram of one embodiment of a process for performing a wireless transmission of data. The process is performed by processing logic that may comprise hardware (circuitry, dedicated logic, etc.), software (such as is run on a general purpose computer system or a dedicated machine), or a combination of both. In one embodiment, the process is performed by a base station.

Referring to FIG. 6, the process begins by initialing an RF preprocessing matrix (processing block 601). In one embodiment, the RF preprocessing matrix is initialized by determining an angular power spectrum (APS), and the entries of the correlation matrix are chosen in such a way that beams are formed in the directions in which the APS has appreciable amplitude.

Next, processing logic jointly selects positions of transmission switches of a switching matrix of a wireless device and elements of a preprocessing matrix of an RF preprocessor at a transmitter (e.g., transmitter of a base station), where the switching matrix couples a plurality of transmission chains of the transmitter to the RF preprocessor in the wireless device (processing block 602). In one embodiment, this includes determining the positions of transmission switches based on instantaneous channel state information and adjusting elements of the preprocessing matrix as a function of average channel state information.

In one embodiment, the positions of the switches and elements of the preprocessing matrix are jointly chosen to increase an expected transmission rate that can be decoded at a desired quality level by at least one receiver. In one embodiment, that receiver contains a single antenna element. In one embodiment, that receiver contains multiple antenna elements.

In one embodiment, adjusting elements (e.g., weights) of the preprocessing matrix comprises adapting the preprocessing matrix based on a first approximation of throughput achievable with a particular preprocessing matrix, where the first approximation is made using by 2nd order statistics, and approximations of cross-correlations between the throughputs achieved by different sub-arrays of antennas in the plurality of antennas. In one embodiment, the 2nd-order statistics of the eigenvalues comprise a Gaussian approximation. In another embodiment, the 2nd-order statistics comprise a log-normal approximation. In one embodiment, elements of the preprocessing matrix are identified through a numerical search that evaluates expected throughput values for different preprocessing matrices.

In one embodiment, jointly selecting positions of transmission switches of a switching matrix of a wireless device and elements of a preprocessing matrix of an RF preprocessor at a transmitter comprises computing the cross-correlations of Gaussian variables as if an infinite number of antenna elements are available. In one embodiment, the achievable capacity for a given preprocessing matrix is computed, in part, by determining the maximum of a set of correlated Gaussian variables.

In one embodiment, the switch positions and the preprocessing matrix are selected to enable simultaneous transmission to multiple users.

Thereafter, processing logic performs transmissions using the jointly selected RF preprocessing matrix and switch positions of the switching matrix, including using the preprocessing matrix to form beams for transmitting signals to a receiver (processing block 603).

Algorithm Initialization

In one embodiment, an integral part of the inner/outer loop methods disclosed herein is the algorithm initialization, and in particular the initialization choice of the beam-former (see FIG. 1). Several embodiments exist, each corresponding to a different ad-hoc option for initialization:

(i) In one embodiment, the beamformer settings of section IV.B of Sudarshan et al, "Channel Statistics-Based RF Pre-Processing with Antenna Selection," *IEEE Transactions on Wireless Communications*, vol. 5, no. 12, pp. 3501-3511, December 2006 are used as a starting point.

(ii) In one embodiment, when using antenna arrays with known geometrical structure, a directional analysis is first performed, e.g., through Bartlett or Capon beamformer, MUSIC, SAGE, or other high-resolution algorithms that are well-known in the art. This analysis can then be exploited by the preprocessor to form a beam in the direction of the main multipath components. This can be achieved, e.g., by maximum ratio transmission according to the average signal strength.

Figure 7:
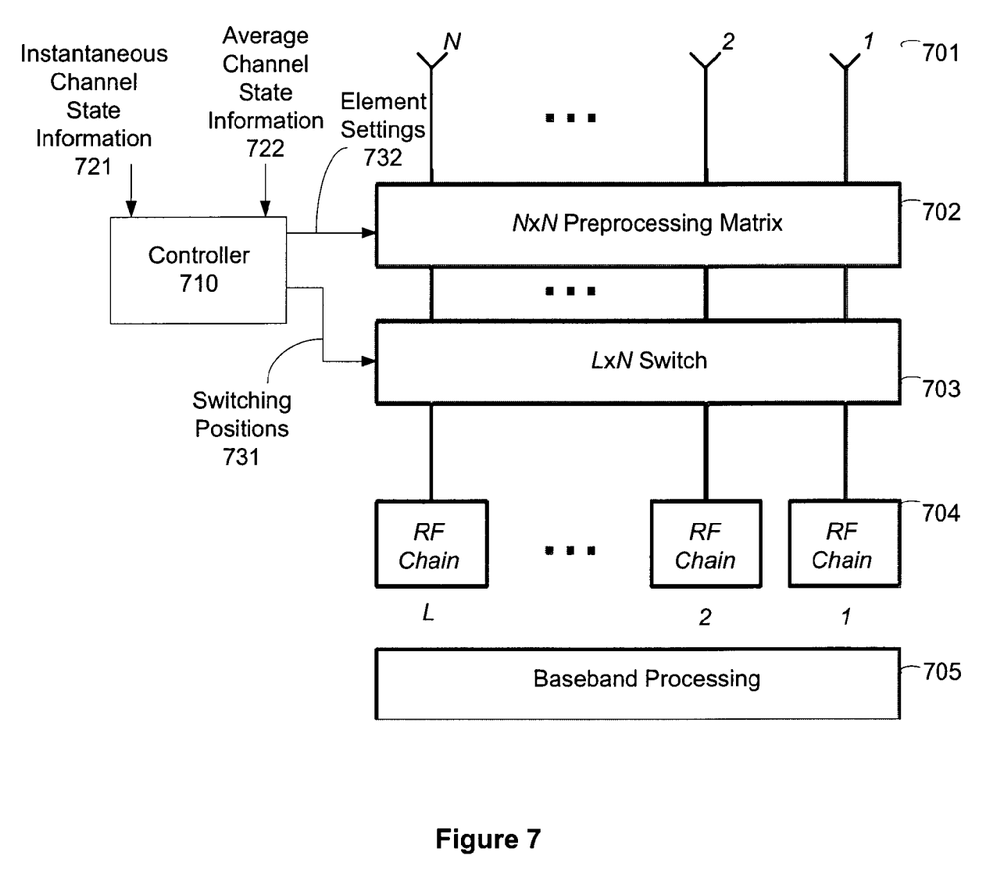
FIG. 7 is a block diagram of one embodiment of reduced complexity baseband processing at a mobile station.

Note that the techniques described herein with respect to jointly selecting the RF preprocessing matrix and switch positions of the switching matrix are applicable to a receiver as well. FIG. 7 is a block diagram of one embodiment of reduced complexity baseband processing at a mobile station. Referring to FIG. 7, the receiver (e.g., a mobile station) comprises multiple antenna elements 701; an RF preprocessor with a preprocessing matrix 702, an N×L switch 703 with a switching matrix, multiple RF reception chains 704 (e.g., demodulator), and a baseband processor 705. RF preprocessor 702 is coupled to outputs of antenna elements 701 and applies a preprocessing matrix to preprocess signals from antenna elements 701. The elements (e.g., weights) of the preprocessing matrix are selected (or adjusted from previously selected or initialized elements) as a function of average channel state information. The N×L switch matrix 703 has multiple switches connecting outputs of RF preprocessor 702 to the reception chains 704, where positions of switches in switch 703 are determined by instantaneous channel state information, and the positions of the switches and elements of the preprocessing matrix are jointly chosen. Baseband processor 705 is coupled to the plurality of reception chains 704 and performs baseband processing.

The Multi-User Case

The techniques described above can also be applied to the case of multi-user MIMO. Consider the case that all the mobile stations have the same correlation matrix. Then in the uplink, the overall receive signal at the BS antenna elements can be written as $$\begin{bmatrix} y_1 \\ y_2 \\ \vdots \\ y_N \end{bmatrix} = \begin{bmatrix} h_{11} & h_{12} & \cdots & h_{1K} \\ h_{21} & h_{22} & \cdots & h_{2K} \\ \vdots & \vdots & \ddots & \vdots \\ h_{N1} & h_{N2} & \cdots & h_{NK} \end{bmatrix} \begin{bmatrix} x_1 \\ x_2 \\ \vdots \\ x_K \end{bmatrix}$$

where, as in the single user case, the "effective" channel matrix is $H=R_r^{1/2}GR_t^{1/2}$. In other words, each of the different users acts like an antenna (or group of antennas) in the single-user case and can process the signals in a similar manner. In one embodiment, for the uplink, the correlation matrix at the receiver is an aggregate of the correlation matrices that would be created if only a single user were transmitting. For the downlink, the signal is described by stacking the signals for the different receivers, and the correlation matrix can then be easily obtained from this description.

In another embodiment, the downlink sum capacity can be expressed as:

$$C = \log_2 \left| I + \frac{\rho}{K} \sum_u H_u P_u H_u^H \right|$$

where, $H_u$ is the downlink channel to user u and $P_u$ is the power allocated to user u. Assuming the channel matrices to each user are simultaneously diagonalizable, the eigen values of $$\left[ \sum_u H_u P_u H_u^H \right]$$

(in the equation above) are the sum of the individual eigen values of the channel to each user $[H_u P_u H_u^H]$, whose $2^{nd}$ order statistics can be computed as discussed in the single user case.

In one embodiment, the capacity computation is done for the uplink where a joint maximum-likelihood detection can be performed at the receiver. For the downlink, dirty-paper coding can achieve similar performance. If a lower-complexity solution is desired for the downlink, zero-forcing or MMSE transmission should be used.

Sounding Signals for Determination of the Correlation Matrix

At the core of one proposed technique is the adjustment of the preprocessing matrix to the correlation matrix (second-order statistics) of the signals at the BS antennas. In contrast to "standard" MIMO systems, the determination of this correlation matrix is not straightforward. A new training methodology and associated signaling is disclosed herein to solve this problem.

Consider the uplink, in which the correlation matrix is determined. In traditional MIMO, the receiver (RX) receives signals from the transmitter (TX) for different channel realizations, since it is assumed that the TX sends its signals at different times. As a matter of fact, the channel from each TX antenna element to each RX antenna element is usually trained. The RX can then form the correlation matrix in a simple manner, by assuming that channel realizations at different times constitute the ensemble, and thus HH* can be averaged over these realizations to obtain the correlation matrix.

In the considered transceiver structure with simplified RX, such a training is not possible. By design, the signals at the different antenna elements are not available separately, but only their combinations (as obtained at the output from the beamformer). Thus, in order to obtain the full correlation matrix, a training signal would have to be sent out by each transmitter N/L times, i.e., often enough that the RX can cycle its available RF chains through all possible antenna elements. This sequence of training signals would have to be sent out multiple times to obtain multiple channel realizations before the complete correlation matrix can be obtained.

To make the training process significantly more efficient, in one embodiment, a new training sequence is used that does not aim to correctly estimate the instantaneous channel matrix, but only tries to estimate the correlation matrix. Notice that in order to obtain the RX correlation matrix, the channel from all TX antenna elements to the RX elements is not needed, but rather the different TX signals can be seen as corresponding to different channel realizations, so that they provide already an implicit averaging. In other words, instead of having to increase the number of transmitted training sequences by a factor of $N_r$, it can be decreased by an appropriate factor. Obtaining averaged channel conditions with multiple TX antennas can be achieved through any of the standard transmit diversity techniques, such as delay diversity transmission. The resulting frequency-selective channel observed at the RX provides different channel realizations at the different antenna elements. In order to further decrease the overhead inherent in the transmission of training packets, multiple OFDM symbols that provide different delay diversity (and thus different channel realizations) can be transmitted. Thus, instead of having to transmit $K_1$ different training symbols with one OFDM training symbol (each having to contain acquisition sequences and other overhead), a single training sequence with $K_1$ training symbols is sent. This technique is effective whenever the so-called frequency ergodicity is valid, which is fulfilled in almost all practical land mobile radio channels.

Figure 4:
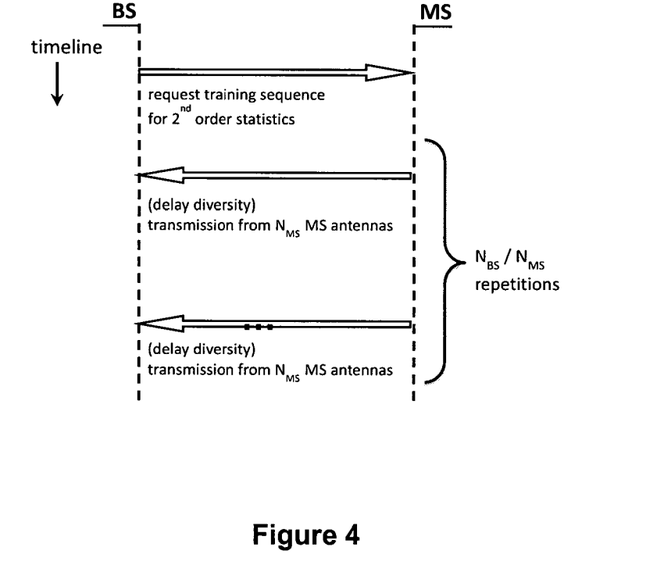
FIG. 4 illustrates a timing diagram showing a sample channel sounding protocol in accordance to the methods disclosed in the invention, where the BS is the initiator.

The transmission of the correlation-training sequence(s) can be either initiated by the mobile station (MS) or the BS. In the former case, the MS may be scheduled for transmission, and either directly sends the special training sequence, or it requests permission from the BS to send the training sequence, and after receiving the grant from the BS starts to transmit. If the BS is initiator, it can send a request to the MS to start transmitting the special sequence. A timing diagram depicting a sample realization of this embodiment is shown in FIG. 4.

One embodiment of the method of correlation matrix training can be further made more efficient by realizing that the correlation matrix usually does not change dramatically between two training processes. Consider now the situation that the arriving signals are angularly constrained. Then training the RX signals only in the angular range that is larger by a small percentage than the previously observed angular range is sufficient. Note that a small angular range of the arriving signal means that (for a linear array) not all antenna elements have to be trained, but rather only every q-th antenna element.

In one embodiment, the training signals are replaced by data-carrying signals, i.e., by signals that are not known at the receiver. In one embodiment, the transmitter generates a sequence of known training signals, and modulates on this sequence a data-carrying symbol sequence, i.e., a sequence of symbols that carry data for a receiver and are thus unknown at the receiver. The receiver uses its knowledge of the modulation and coding scheme used at the transmitter to generate the data-carrying symbol sequence, together with knowledge of the specific training signal sequence on which the unknown data symbol sequence is generated, in order to estimate the channel and decode the symbol-carrying sequence. In one embodiment, the receiver uses a prior estimate of the channel, together with the received data-modulated training signal, to update its channel estimates but also decode the information bearing symbol sequence carrying on the data-modulated training signal.

Figure 5:
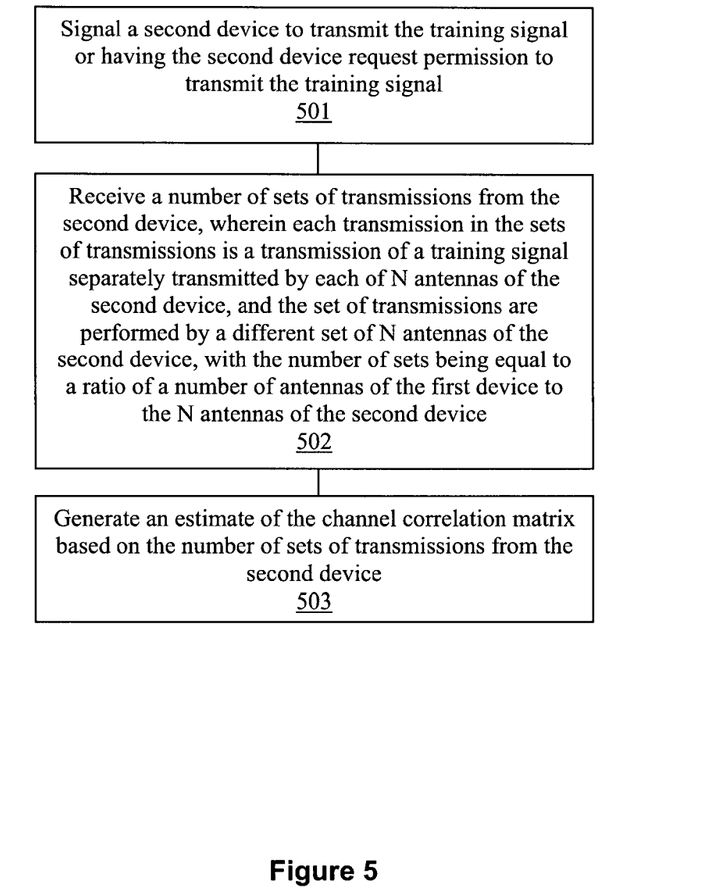
FIG. 5 is a flow diagram of one embodiment of a process for learning a channel correlation matrix between a first device (e.g., a base station) having a transmitter and a second device having a receiver (e.g., a mobile station).

FIG. 5 is a flow diagram of one embodiment of a process for learning a channel correlation matrix between a first device (e.g., a base station) having a transmitter and a second device having a receiver (e.g., a mobile station), without requiring learning of specific instantaneous channel realizations between the transmitter and the receiver. The process is performed by processing logic that may comprise hardware (circuitry, dedicated logic, etc.), software (such as is run on a general purpose computer system or a dedicated machine), or a combination of both. In one embodiment, the process is performed by a base station.

Referring to FIG. 5, the process begins by signaling the mobile device to transmit the training signal or having the mobile device request permission to transmit the training signal (processing block 501).

Next, processing logic receives a number of sets of transmissions from the mobile device, wherein each transmission in the sets of transmissions being a transmission of a training signal separately transmitted by each of N antennas of the mobile device, and the set of transmissions are performed by a different set of N antennas of the mobile device, with the number of sets being equal to a ratio of a number of antennas of the base station to the N antennas of the mobile device (processing block 502). The number N is an integer. In one embodiment, each set of transmissions comprises transmission a delay diversity signal transmitted from the N antennas of the mobile device.

In one embodiment, each training signal includes a plurality of OFDM training symbols, and wherein transmission of each of the plurality of OFDM symbols providing a different delay diversity. In another embodiment, the training signal comprises a data carrying signal, the data carrying signal being a data carrying signal sequence modulated onto a another signal.

After receiving the sets of transmissions, processing logic generates an estimate of the channel correlation matrix based on the number of sets of transmissions from the mobile device (processing block 503). The generated correlation matrix may be used to compute the capacities as described above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless apparatus for use in a wireless communication system, the apparatus comprising:
a plurality of antenna elements;
a baseband processor;
a plurality of radio-frequency (RF) chains coupled to the baseband processor;
a plurality of switches coupled to the plurality of RF chains, wherein positions of switches in the plurality of switches being determined by instantaneous channel state information;
a radio-frequency (RF) preprocessor coupled between the plurality of switches and the plurality of antenna elements, the RF preprocessor to apply a preprocessing matrix to signals, elements of the preprocessing matrix being adjusted as a function of average channel state information, and wherein the positions of the switches and elements of the preprocessing matrix are jointly chosen, and wherein the preprocessing matrix is chosen based on a metric related to expected performance obtained from at least one channel realization.

2. The apparatus defined in claim 1 wherein the expected performance metric is expected transmission rate.

3. The apparatus defined in claim 1 wherein the RF preprocessor comprises at least one selected from a group consisting of: a plurality of phase shifters and a plurality of variable gain amplifiers.

4. The apparatus defined in claim 1 wherein the RF preprocessor adapts the preprocessing matrix based on a first approximation of throughput achievable with a particular preprocessing matrix, where the first approximation is made using by 2nd order statistics, and approximations of cross-correlations between the throughputs achieved by different sub-arrays of antennas in the plurality of antennas.

5. The apparatus defined in claim 4 wherein the distribution of the achievable throughput is approximated as a given parameterized distribution.

6. The apparatus defined in claim 5 wherein the parameterized distribution is a Gaussian distribution.

7. The apparatus defined in claim 5 wherein the parameterized distribution is a log-normal distribution.

8. The apparatus defined in claim 5 further comprising a controller to compute the cross-correlations as if an infinite number of antenna elements are available.

9. The apparatus defined in claim 5 wherein a function of achievable throughput for a given preprocessing matrix is computed, in part, by determining a function of the maxima of a set of correlated Gaussian variables.

10. The apparatus defined in claim 4 wherein elements of the preprocessing matrix are identified through a numerical search that is based on functions of achievable throughput values for different preprocessing matrices.

11. The apparatus defined in claim 10 wherein the preprocessing matrix is initialized by determining an angular power spectrum, and further wherein the preprocessing matrix is used to form beams in relation to the angular power spectrum.

12. The apparatus defined in claim 1 wherein the switch positions and the preprocessing matrix are selected to enable simultaneous transmission to multiple users.

13. The apparatus defined in claim 1 wherein the plurality of RF chains are a plurality of transmission chains and the RF preprocessor is to apply the preprocessing matrix to process signals from the plurality of switches and to couple the processed signals to antenna elements in the plurality of antenna elements.

14. The apparatus defined in claim 1 wherein the plurality of RF chains comprises a plurality of reception chains, and the RF preprocessor is to apply a preprocessing matrix to process signals from the plurality of antenna elements and the switch matrix is to connect outputs of the RF preprocessor to the plurality of reception chains.

15. A wireless apparatus for use in a wireless communication system, the apparatus comprising:
a plurality of antenna elements;
a baseband processor;
a plurality of radio-frequency (RF) chains coupled to the baseband processor;
a plurality of switches coupled to the plurality of RF chains, wherein positions of switches in the plurality of switches being determined by instantaneous channel state information;
a radio-frequency (RF) preprocessor coupled between the plurality of switches and the plurality of antenna elements, the RF preprocessor to apply a preprocessing matrix to signals, elements of the preprocessing matrix being adjusted as a function of average channel state information, and wherein the positions of the switches and elements of the preprocessing matrix are jointly chosen, and wherein the switch positions and the preprocessing matrix are selected to enable simultaneous transmission to multiple users.

16. A method for learning a channel correlation matrix between a first device having a transmitter and a second device having a receiver, without requiring learning of specific instantaneous channel realizations between the transmitter and the receiver, the method comprising:
receiving a number of sets of transmissions from the second device, wherein each transmission in the sets of transmissions being a transmission of a training signal separately transmitted by each of N antennas of the second device, and said set of transmissions being performed by a different set of N antennas of the second device, the number of sets being equal to a ratio of a number of antennas of the first device to the N antennas of the second device; and
generating an estimate of the channel correlation matrix based on the number of sets of transmissions from the second device.

17. The method defined in claim 16 wherein each set of transmissions comprises transmission a delay diversity signal transmitted from the N antennas of the second device.

18. The method defined in claim 16 further comprising signaling the second device to transmit the training signal.

19. The method defined in claim 16 further comprising requesting, by the second device, permission to transmit the training signal.

20. The method defined in claim 16 wherein each training signal includes a plurality of OFDM training subcarriers, and wherein transmission of each of the plurality of OFDM subcarriers providing a different delay diversity.

21. The method defined in claim 16 wherein the training signal comprises a data carrying signal, the data carrying signal being a data carrying signal sequence modulated onto another signal.

22. The method defined in claim 16 wherein the first device comprises a base station and the second device comprises a mobile station.

23. A method for performing a wireless transmission of data, the method comprising:
jointly selecting positions of transmission switches of a switching matrix of a wireless device and elements of a preprocessing matrix of an RF preprocessor at a transmitter, the switching matrix coupling a plurality of transmission chains to the RF preprocessor in the wireless device, including determining the positions of transmission switches based on instantaneous channel state information; and adjusting elements of the preprocessing matrix as a function of average channel state information, and wherein the preprocessing matrix is chosen based on a metric related to expected performance obtained from at least one channel realization.

24. The method defined in claim 23 wherein the expected performance metric is expected transmission rate.

25. The method defined in claim 24 wherein the at least one receiver contains a single antenna element.

26. The method defined in claim 25 wherein the at least one receiver contains a plurality of antenna elements.

27. The method defined in claim 23 further comprising adapting the preprocessing matrix based on a first approximation of throughput achievable with a particular preprocessing matrix, where the first approximation is made using by 2nd order statistics, and approximations of cross-correlations between the throughputs achieved by different sub-arrays of antennas in the plurality of antennas.

28. The method defined in claim 27 wherein distribution of the achievable throughput is approximated as a given parameterized distribution.

29. The method defined in claim 28 wherein the parameterized distribution is a Gaussian distribution.

30. The method defined in claim 28 wherein the parameterized distribution is a log-normal distribution.

31. The method defined in claim 28 further comprising a controller to compute the cross-correlations of Gaussian variables as if an infinite number of antenna elements are available.

32. The method defined in claim 28 wherein the achievable throughput for a given preprocessing matrix is computed, in part, by determining the maximum of a set of correlated Gaussian variables.

33. The method defined in claim 27 wherein elements of the preprocessing matrix are identified through a numerical search that is based on functions of achievable throughput values for different preprocessing matrices.

34. The method defined in claim 33 further comprising:
initialing the preprocessing matrix by determining an angular power spectrum; and
using the preprocessing matrix to form beams in relation to the angular power spectrum.

35. The method defined in claim 23 wherein the switch positions and the preprocessing matrix are selected to enable simultaneous transmission to multiple users.

* * * * *